(12) United States Patent
Terunuma

(10) Patent No.: US 6,477,018 B1
(45) Date of Patent: *Nov. 5, 2002

(54) THIN-FILM MAGNETIC HEAD AND METHOD OF MANUFACTURING THE SAME

(75) Inventor: Koichi Terunuma, Tokyo (JP)

(73) Assignee: TDK Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/349,115

(22) Filed: Jul. 8, 1999

(30) Foreign Application Priority Data

Jul. 14, 1998 (JP) ............................. 10-213449

(51) Int. Cl.$^7$ ................................. G11B 5/39
(52) U.S. Cl. ........................................ 360/317
(58) Field of Search ........................... 360/317

(56) References Cited

U.S. PATENT DOCUMENTS

| | | | | |
|---|---|---|---|---|
| 5,751,522 A | * | 5/1998 | Yamada et al. | 360/113 |
| 5,943,763 A | * | 8/1999 | Shouji et al. | 29/603.14 |
| 6,154,347 A | * | 11/2000 | Sasaki | 360/317 |

FOREIGN PATENT DOCUMENTS

| | | |
|---|---|---|
| JP | 3-63912 | 3/1991 |
| JP | 6-333210 | 12/1994 |
| JP | 07-121826 | 5/1995 |
| JP | 9-305905 | 11/1997 |

* cited by examiner

*Primary Examiner*—George J. Letscher
(74) *Attorney, Agent, or Firm*—Arent Fox Kintner Plotkin & Kahn

(57) ABSTRACT

A thin-film magnetic head includes a substrate with a surface, first and second shield layers formed above the substrate, and a MR sensor element formed between the first and second shield layers. The MR sensor element has a magnetic sensing region formed with a specific slant angle against the surface of the substrate.

9 Claims, 6 Drawing Sheets

THIN-FILM MAGNETIC HEAD AND METHOD OF MANUFACTURING THE SAME

FIELD OF THE INVENTION

The present invention relates to a thin-film magnetic head for recording data and/or reproducing the data in a magnetic medium such as a hard disk or a floppy drive, and to a method of manufacturing the thin-film magnetic head.

DESCRIPTION OF THE RELATED ART

Very narrow width recording and reproducing data to and from magnetic media is more and more progressing in accordance with the recent requirements of high density recording of storage devices, and sub-micron width of magnetic writing track is needed to satisfy the recording density equal to or more than 10 Gbpi.

In order to realize such very narrow width writing and reproducing, a magnetic head with a magnetic gap that tilts against the direction of the writing track width, such as an azimuth-angled magnetic head usually used in VTR is well known.

Japanese Patent Unexamined Publication No.06-333210 discloses a thin-film magnetic head in which a magnetic layer is partially etched away to form a tilted area and then a writing gap is formed along the tilted area.

Japanese Patent Unexamined Publication No.03-063912 discloses a thin-film magnetic head in which a first magnetic layer is partially removed to form a tilted area by mechanical processing, ion milling or etching, then a writing gap and a second magnetic layer are stacked, and after that a magnetoresistive effect (MR) sensor element is formed in the middle of a yoke constituted by the first and second magnetic layers.

Japanese Patent Unexamined Publication No.09-305905 discloses a thin-film magnetic head in which a pair of yokes are formed so as to oppose with each other via an azimuth angled magnetic gap, and then a MR sensor element is formed between the yokes.

In case of Japanese Patent Unexamined Publication No.06-333210, however, both data recording and reproducing are done by inductive coils, and hence the read head inductance becomes large and it is difficult to get large reproduced signals.

In cases of Japanese Patent Unexamined Publication Nos.03-063912 and 09-305905, MR sensor elements are provided. However, since the data are recorded with a definite azimuth angle on magnetic mediums, the sensor elements are placed between the two yokes and therefore large reproduced signals cannot be expected.

SUMMARY OF THE INVENTION

It is therefore an object of the present invention to provide a thin-film magnetic head whereby recorded data on a magnetic medium with an azimuth angle toward a track width direction can be reproduced with large output signals, and to provide a manufacturing method of the head.

According to the present invention, a thin-film magnetic head includes a substrate with a surface, first and second shield layers formed above the substrate, and a MR sensor element formed between the first and second shield layers. The MR sensor element has a magnetic sensing region formed with a specific slant angle against the surface of the substrate.

The magnetic information recorded by a recording head with the azimuth-angled gap can be sensed with large output signals, because the magnetic sensing region of the MR read element slants against the substrate surface. As a result, both of narrower writing track width and larger output signals can be realized.

It is preferred that the first shield layer is constituted by a single shield layer or independent multi shield layers positioned at the same side of the substrate with respect to the MR sensor element, and that the second shield layer is constituted by a single shield layer or independent multi shield layers positioned at opposite side of the substrate with respect to the MR sensor element.

It is also preferred that each of the first and second shield layers consists of only a magnetic layer or a multi-layered structure formed by alternatively stacking magnetic and non-magnetic layers.

It is preferred that the thin-film magnetic head further includes a recording element formed in integral with the MR sensor element, and that the recording element comprises a writing gap layer which slants against the surface of the substrate so as to become in parallel with the MR sensor element, and a first and a second magnetic pole layers facing each other through the writing gap.

In this case, it is preferred that the thin-film magnetic head further includes auxiliary magnetic pole layers formed in contact with the first and second magnetic pole layers, respectively.

It is also preferred that each of the first and second magnetic pole layers consists of only a magnetic layer or a multi-layered structure formed by alternatively stacking magnetic and non-magnetic layers.

According to the present invention, also a method of manufacturing a thin-film magnetic head, includes the steps of preparing a substrate with a surface, depositing a first shield layer on the surface of the substrate, partially forming a slant surface of the first shield layer by milling the first shield layer through a mask which covers a part of the first shield layer so that the slant surface has a specific angle against the surface of the substrate, forming, on the first shield layer via a shield gap layer, a MR layer with a magnetic sensing region which positions along the slant surface, and forming a second shield layer on the MR layer via a shield gap layer.

It is preferred that the method further includes the steps of planarizing an upper surface of the second shield layer, depositing a first magnetic pole layer above the upper surface of the second shield layer, partially forming a slant surface of the first magnetic pole layer by milling the first magnetic pole layer through a mask which covers a part of the first magnetic pole layer so that the slant surface becomes in parallel with the magnetic sensing region of the MR layer, forming a writing gap layer on the first magnetic pole layer, forming a second magnetic pole layer on the writing gap layer, and planarizing an upper surface of the second magnetic pole layer.

Further objects and advantages of the present invention will be apparent from the following description of the preferred embodiments of the invention as illustrated in the accompanying drawings.

DESCRIPTION OF THE PREFERRED EMBODIMENTS

Figure 1:
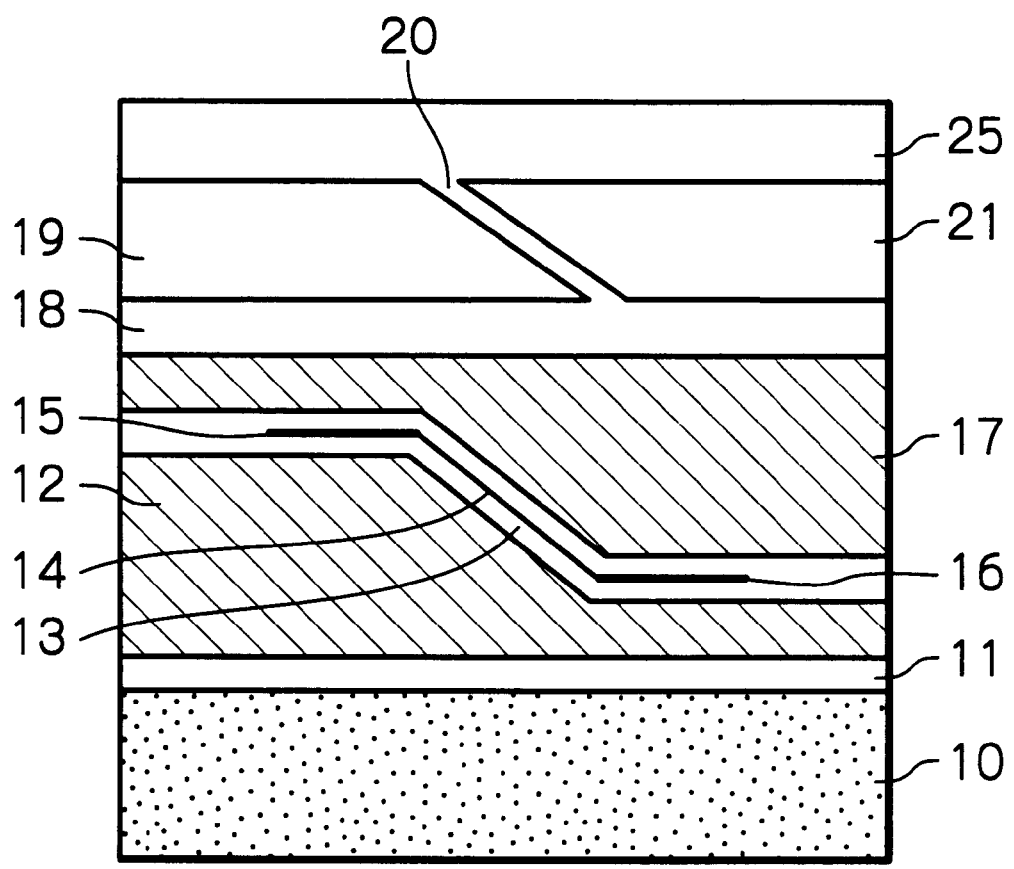
FIG. 1 shows a cross sectional view of a thin-film magnetic head in a preferred embodiment of the present invention from ABS (Air Bearing Surface) direction of a slider.
Figure 2:
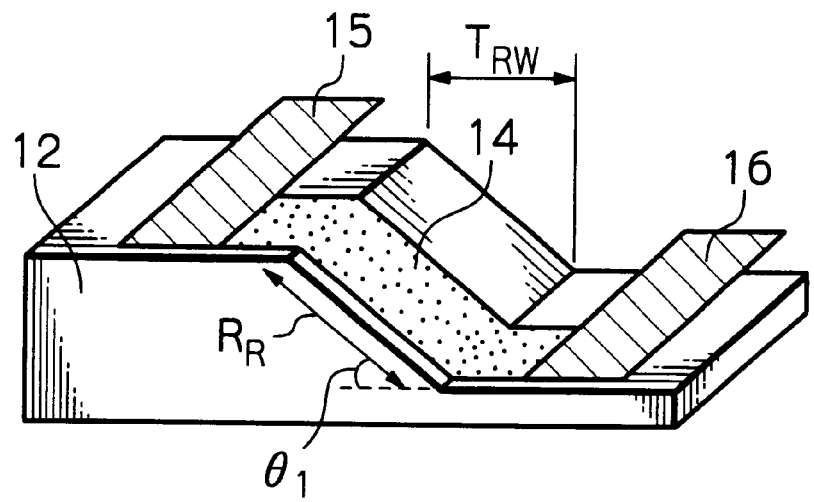
FIG. 2 is an oblique view of the structure of a reproducing head part in the embodiment shown in FIG. 1.
Figure 3:
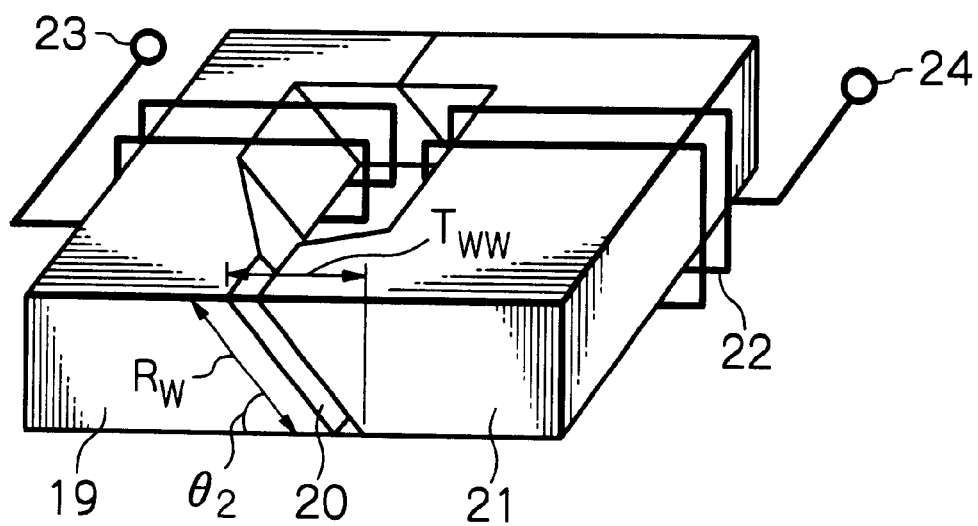
FIG. 3 is an oblique view of the structure of a recording head part in the embodiment shown in FIG. 1.

FIG. 1 illustrates a thin-film magnetic head in a embodiment of the present invention from ABS (Air Bearing Surface) direction of a slider, FIG. 2 illustrates the structure of a reproducing head part, and FIG. 3 illustrates the structure of a recording head part. The magnetic head in this embodiment consists of a reproducing head part by MR effect and a recording head part by inductive coil, and they are stacked each other, and thus this head is a hybrid type thin-film magnetic head.

In those figures, reference numeral 10 denotes a substrate, 11 an insulation layer formed on the substrate 10, 12 a first shield layer formed on the insulation layer 11, and 13 a shield gap layer formed on the first shield layer 12, respectively.

A part of the surface of the first shield layer 12 corresponding to a magnetoresistive (MR) sensing or reading region $R_R$ of a MR sensor element is formed with a specific slant angle of $\theta_1$ against the surface of the substrate 10.

On the first shield layer 12, a MR layer 14 sandwiched in the shield gap layer 13 is formed. To the both ends of the MR layer 14, conductive lead layers (with magnetic domain control layers) 15 and 16 are connected. On the shield gap layer 13, a second shield layer 17 is formed. The surface of this second shield layer 17 is planarized in parallel with the surface of the substrate 10.

Since a part of the surface of the first shield layer 12 is formed with a specific slant angle of $\theta_1$ against the surface of the substrate 10, the MR reading region $R_R$ of the MR layer 14 stacked on the slant area of the first shield layer 12 is also formed with the angle of $\theta_1$ against the surface of the substrate 10. As for the angle of $\theta_1$, according to this embodiment, an arbitrary value in a range of 30–60 degrees is selected. If the reading track width is represented by $T_{RW}$, the length of MR reading region becomes $T_{RW}/\cos\theta_1$. The MR layer 14 can be formed with overlapping the outer area of the slant portion as shown in this embodiment, or formed inside the area of the slant portion.

On the second shield layer 17, an insulation layer 18 is stacked, and a first magnetic pole layer 19 is formed. The end surface of the first magnetic pole layer 19 is formed with a specific slant angle of $\theta_2$ against the surface of the substrate 10.

On the insulation layer 18, a second magnetic pole layer 21 is formed. The end surface of the second magnetic pole layer 21 is facing against the end surface of the first magnetic pole layer 19 through a writing gap 20. The sandwiched area of the writing gap 20 corresponds to the magnetic writing region $R_W$ of an inductive coil 22. The first and second magnetic pole layers 19 and 21 constitute a magnetic yoke as shown in FIG. 3, and the inductive coil 22 is helically formed around the yoke. The helical type coil 22 has a merit of more precise fabrication of the writing gap in comparison with the conventional spiral type coil because no stepping shape is formed. The both ends of the coil 22 constitute electrical leads 23 and 24. On the first and second magnetic pole layers 19 and 21, an insulation layer 25 is stacked. In this embodiment, $\theta_2=\theta_1=30$–60 degrees. If the writing track width is represented by $T_{WW}$, the thickness of the first and second magnetic pole layers 19 and 21 becomes $T_{WW} \tan\theta_2$. And the length of the magnetic writing region $R_W$ becomes $T_{WW}/\cos\theta_2$.

The center location of the reading track associated with the MR sensor element and that of the writing track associated with the inductive recording element is matched each other as shown in this embodiment, but the center locations can be shifted in accordance with the skew by a relation between head arm and track in a magnetic disk unit. The vertical position of the MR sensor element and the inductive recording element can be reversibly exchanged. Namely, the inductive recording element may be built on the substrate and on this recording element the MR sensor element may be stacked.

FIGS. 4a to 4i illustrate a manufacturing process of the reproducing head part according to the embodiment shown in FIG. 1, and FIGS. 5a to 5g illustrate a manufacturing process of the recording head part according to the embodiment shown in FIG. 1. Hereinafter, a manufacturing method of a thin-film magnetic head in this embodiment will be described with reference to these figures.

Figure 4A:
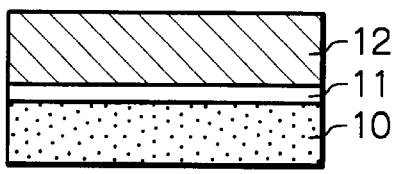
FIGS. 4a to 4i show a manufacturing process of the reproducing head part in the embodiment shown in FIG. 1.

First, as shown in FIG. 4a, on a substrate 10 of a material such as AlTiC, an insulation layer 11 of $Al_2O_3$ with thickness of 0.1–10 μm is formed, and on the insulation layer 11 the first shield layer 12 is deposited. This shield layer 12 is made of a material of NiFe alloy, FeAlSi alloy, Co amorphous alloy, Fe—M—N, Fe—M—C, or Fe—M—N—O (where M means Al, Si, B, Ti, Zr, Ta, Hf, Nb or Mo etc). The thickness of the first shield layer 12 depends on the reading track width $T_{RW}$, and usually is in the range of 0.1–3.0 μm.

Figure 4B:
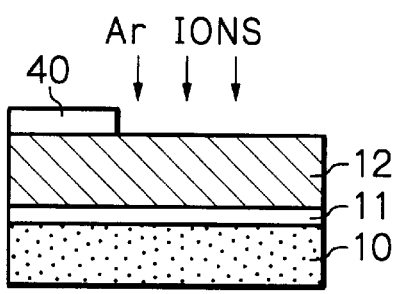
Figure 4C:
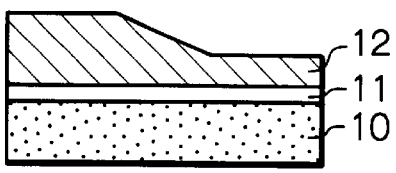

Then, as shown in FIG. 4b, a mask 40 is specifically formed on the first shield layer 12, and ion milling is done. The example shown in FIG. 4b is a case by Ar ion milling. There are different milling methods by reactive ion etching (RIE), focused ion beam (FIB) and others other than the Ar ion milling. When ion milling is done perpendicularly to the surface of the substrate 10, the surface of the first shield layer 12 slants with 45 degrees within a certain distance from the edge of the mask 40 as shown in FIG. 4c. In order to change the angle of the slant, the injection angle of the ion beam for the milling is adjusted. FIG. 4c shows the condition after removal of the mask.

Figure 4D:
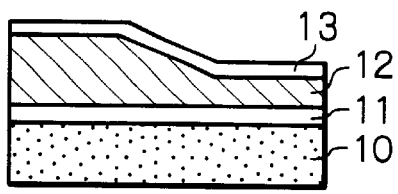

Thereafter, as shown in FIG. 4d, a shield gap layer 13 of a material of $Al_2O_3$ or $SiO_2$ is deposited on the first shield layer 12.

Figure 4E:
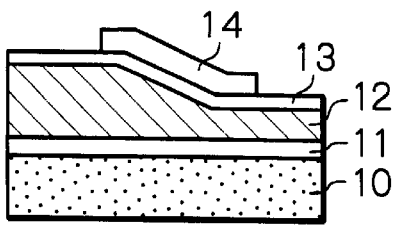

Then, as shown in FIG. 4e, a MR layer 14 is stacked and specifically patterned on the shield gap layer 13. In a case of anisotropy MR sensor element, the MR layer 14 is of a material such as NiFe, and the thickness of the MR layer is in the range of 2–20 nm. In case of a spin valve effect MR sensor element, the MR layer 14 is formed from a multi-layered structure of a first ferromagnetic thin-film layer of NiFe alloy or Co alloy, a non-magnetic metallic thin-film layer of a non-magnetic metallic material such as Cu, a second ferromagnetic thin-film layer of NiFe alloy or Co alloy, and an anti-ferromagnetic thin-film layer of Mn family material such as FeMn alloy, NiMn alloy, PtMn alloy or of oxide material such as $Fe_2O_3$ or NiO, and the thickness of the MR layer is in the range of 2–50 nm.

Figure 4F:
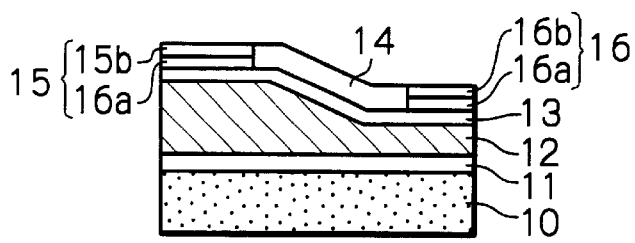

Then, as shown in FIG. 4f, for magnetization control and electrical connection, magnetization control layers 15a and 16a and lead conductors 15b and 16b, are formed at the both ends of the MR layer 14 respectively and on the shield gap layer 13. The magnetization control layers 15a and 16a are formed as a single layer of permanent magnetic material such as CoPt or CoPtCr, as multi-layers of the permanent magnetic material layer stacked on an under film of Cr, as another multi-layers with stacked NiFe or Co amorphous alloy film on the permanent magnetic material layer, or as a further multi-layers NiFe film stacked with anti-ferromagnetic film of Mn family material or oxide material, the thickness of each magnetization control layer is in a range of 0.005–0.2 µm. The lead conductors 15b and 16b are formed of electrically conductive material such as Ta, Cu or Au, and the thickness is in a range of 0.005–0.2 µm.

Figure 4G:
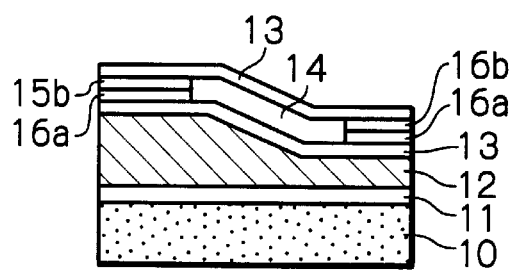

Then, as shown in FIG. 4g, another shield gap layer 13 of a material of $Al_2O_3$ or $SiO_2$ is deposited on the MR sensor element, the lead conductor layers, and the magnetization control layers. The total thickness of the shield gap layer 13 is in a range of 0.01–0.5 µm.

Figure 4H:
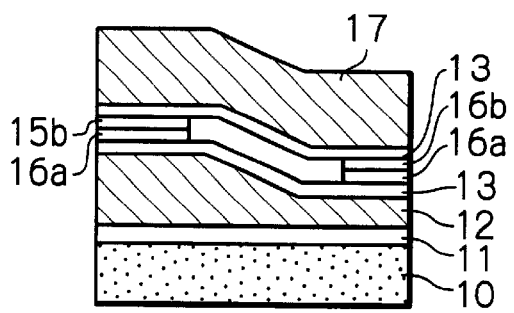

Thereafter, as shown in FIG. 4h, a second shield layer 17 is deposited on the shield gap layer 13. This shield layer 17 is made of a material of NiFe alloy, FeAlSi alloy, Co amorphous alloy, Fe—M—N, Fe—M—C, or Fe—M—N—O (where M means Al, Si, B, Ti, Zr, Ta, Hf, Nb or Mo etc). The thickness of the second shield layer 17 depends on the reading track width $T_{RW}$, and usually is in a range of 0.1–3.0 µm.

Figure 4I:
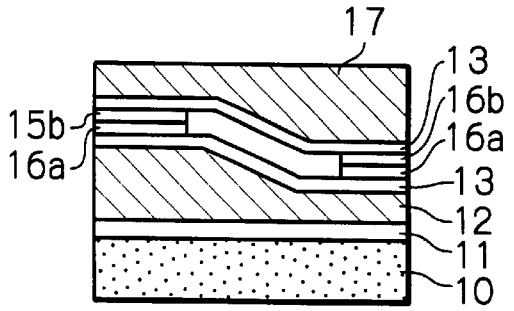

Then, as shown in FIG. 4i, the upper surface of the second shield layer 17 is planarized by chemical-mechanical polishing (CMP) process, and a flat surface is formed in parallel with the substrate 10.

Figure 5A:
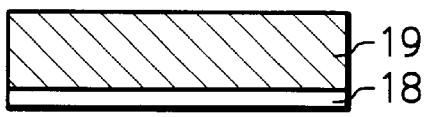
FIGS. 5a to 5g show a manufacturing process of the recording head part in the embodiment shown in FIG. 1.

Thereafter, as shown in FIG. 5a, an insulation layer 18 of a material such as $Al_2O_3$ or others with thickness in a range of 0.1–10 µm on the second shield layer 17, and a first magnetic pole layer 19 is deposited on the insulation layer 18.

This magnetic pole 19 layer is made of a material of NiFe alloy, FeAlSi alloy, Co amorphous alloy, Fe—M—N, Fe—M—C, or Fe —M—N—O (where M means Al, Si, B, Ti, Zr, Ta, Hf, Nb or Mo etc). The thickness of the first magnetic pole layer depends on the writing track width $T_{WW}$, and it becomes $T_{WW}$ tan $\eta_2$.

Figure 5B:
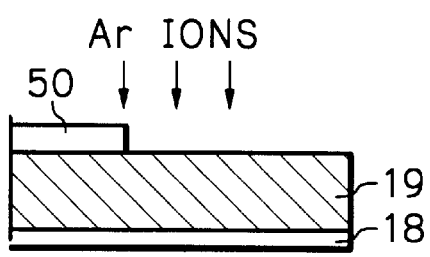
Figure 5C:

Then, as shown in FIG. 5b, a mask 50 is specifically formed on the first magnetic pole layer 19, and ion milling is done. The example shown in FIG. 5b is a case by Ar ion milling. There are different milling methods by reactive ion etching (RIE), focused ion beam (FIB) and others other than the Ar ion milling. When ion milling is done perpendicularly to the surface of the substrate 10, the surface of the first magnetic pole layer 19 slants with 45 degrees within a certain distance from the edge of the mask 50 as shown in FIG. 5c. In order to change the angle of the slant, the injection angle of the ion beam for the milling is adjusted. FIG. 5c shows the condition after removal of the mask.

Figure 5D:
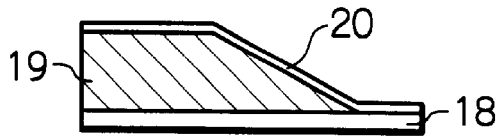

Thereafter, as shown in FIG. 5d, a writing gap layer 20 of a material such as $Al_2O_3$ or others with thickness in a range of 0.01–0.5 µm is formed on the first magnetic pole layer 19.

Figure 5E:
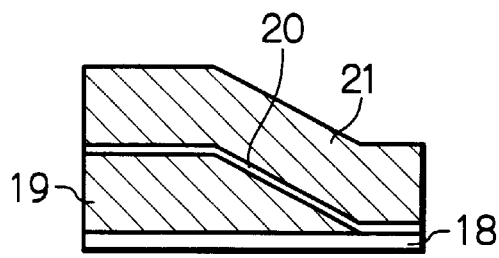

Then, as shown in FIG. 5e, a second magnetic pole layer 21 is deposited on the writing gap layer 20. The material and thickness of the second magnetic pole layer 21 is just same as those of the first magnetic pole layer 19.

Figure 5F:
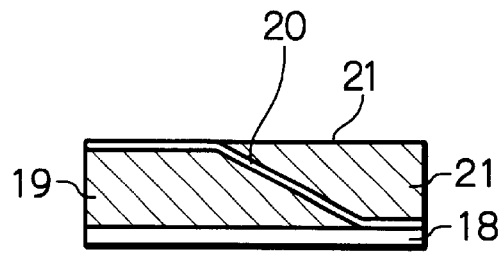

Then, as shown in FIG. 5f, the upper surface of the second magnetic pole layer 21 is planarized by chemical-mechanical polishing (CMP) process, and a flat surface is formed in parallel with the substrate 10.

Figure 5G:
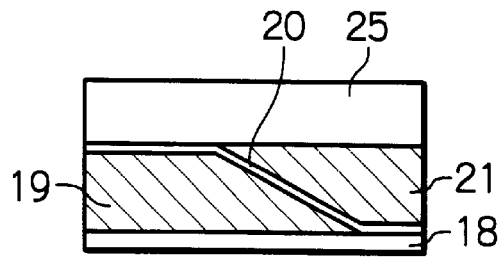

Then, as shown in FIG. 5g, an insulation layer 25 of a material such as $Al_2O_3$ or others with thickness in a range of 1.0–50 µm on the second magnetic pole layer 21.

In the above description, the formation of a helical coil is not included, but actually at the processes of forming the first and second magnetic pole layers 19 and 21 in FIGS. 5a and 5e, such helical coil is formed at the same time. As described in detail, according to this embodiment, the data, which is recorded by a recording head with a specific azimuth angle against the surface of the substrate 10, can be sensed with larger output signals, because the reading region $R_R$ of the MR sensor element 14 slants against the surface of the substrate 10 with a predetermined angle of $\theta_1$. And as the widths of writing and reading tracks are basically defined by the thickness of stacked material layers and ion beam injection angles at milling processing, very narrow widths of writing and reading tracks less than 1 µm can be precisely and easily realized. Furthermore, low aspect ratio (long side way) of a recording pole area on a magnetic disk gives stable magnetic characteristic and good recording and reproducing characteristics. Therefore, both of narrower track widths and larger output levels in reading are resulted concurrently.

Figure 6:
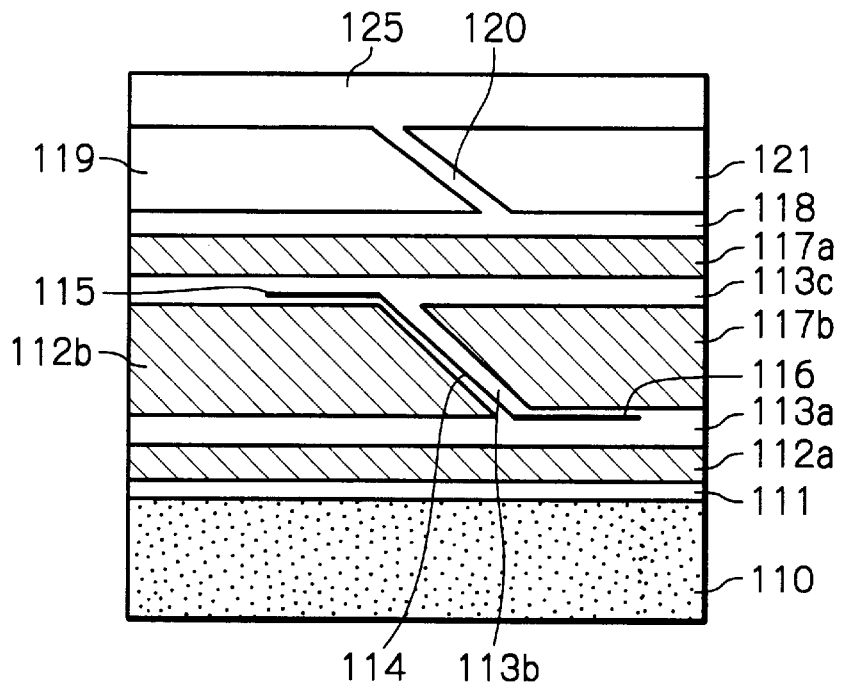
FIG. 6 shows a cross sectional view of a thin-film magnetic head in another embodiment of the present invention from ABS direction of a slider.

FIG. 6 shows a cross sectional view of the thin-film magnetic head in another embodiment of the present invention from ABS direction of a slider.

Referring to the figure, reference numeral 110 denotes a substrate, 111 an insulation layer formed on the substrate 110, 112a a shield layer (thickness is in a range of 0.1–5 µm) formed on the insulation layer 111, 113a a shield gap layer (thickness is in a range of 0.01–0.5 µm) formed on the shield layer 112a, 112b a shield layer (thickness is expressed by $T_{RW}$ tan $\theta_1$) formed on the shield gap layer 113a, respectively. The shield layers 112a and 112b constitute the first shield layer according to the present invention.

The inner end surface of the shield layer 112b constitutes a MR sensing or reading region $R_R$ of a MR sensor element, and this end surface is formed with a specific slant angle $\theta_1$ against the surface of the substrate 110.

On the shield layers 112a and 112b, a MR layer 114 sandwiched in a shield gap layer 113b (thickness is in a range of 0.01–0.5 µm) is formed. To the both ends of the MR layer 114, conductive lead layers (with magnetic domain control layers) 115 and 116 are connected. On the shield gap layers 113b and 113c (thickness is in a range of 0.01–0.5 µm), shield layers 117a (thickness is in a range of 0.1–5 µm) and 117b (thickness is expressed by $T_{RW}$ tan $\theta_1$) are formed. The inner end surface of the shield layer 117b is formed with a specific slant angle and faces with the inner end surface of the shield layer 112b. The shield layers 117a and 117b constitute the second shield layer according to the present invention. The upper surface of the shield layer 117a is planarized in parallel to the surface of the substrate 110.

Since the end surface of the first shield layer 112b is formed with a specific slant angle of $\theta_1$ against the surface of the substrate 110, the MR reading region $R_R$ of the MR layer 114 stacked on the slant area of the first shield layer is also formed with the slant angle of $\theta_1$ against the surface of the substrate 110. As for $\theta_1$, according to this embodiment, an arbitrary value in a range of 30–60 degrees is selected. If the reading track width is represented by $T_{RW}$, the length of MR reading region becomes $T_{RW}/\cos\theta_1$. The MR layer 114 can be formed with overlapping the outer area of the slant portion as shown in this embodiment, or formed inside the area of the slant portion.

On the shield layer 117a, an insulation layer 118 is stacked, and a first magnetic pole layer 119 is formed. The end surface of the first magnetic pole layer 119 is formed with a specific slant angle of $\theta_2$ against the surface of the substrate 110.

On the insulation layer 118, a second magnetic pole layer 121 is formed. The end surface of this layer 121 is facing against the end surface of the first magnetic pole layer 119 through a writing gap 120. The sandwiched area of the writing gap corresponds to the magnetic writing region $R_W$ of an inductive coil. The first and second magnetic pole layers 119 and 121 compose a magnetic yoke, and the inductive coil is helically formed around the yoke. The both ends of the helical coil constitute electrical leads. On the first and second magnetic pole layers 119 and 121, an insulation layer 125 is formed. In this embodiment, $\theta_2=\theta_1=30-60$ degrees. If the writing track width is represented by $T_{WW}$, the thickness of the first and second magnetic pole layers 119 and 121 becomes $T_{WW}\tan\theta_2$. And the length of the magnetic writing region $R_W$ becomes $T_{WW}/\cos\theta_2$.

The center location of the reading track associated with the MR sensor element and that of the writing track associated with the inductive recording element is matched each other as shown in this embodiment, but the center locations can be shifted in accordance with the skew by a relation between head arm and track in a magnetic disk unit. The vertical position of the MR sensor element and the inductive recording element can be reversibly exchanged. Namely, the inductive recording element may be built on the substrate and on this recording element, the MR sensor element may be stacked.

According to this embodiment, since the first shield layer consists of the two independent shield layers 112a and 112b and the shield gap layer 113a is formed under the shield layer 112b, unnecessary void formation at the lower part of the slant of the shield layer 112b can be prevented. In addition to this advantage, the similar advantages as those explained previously for the embodiment of FIG. 1 can be of course obtained. The materials and thickness of layers not stated in the description of this embodiment are the same as those in the embodiment of FIG. 1.

Figure 7:
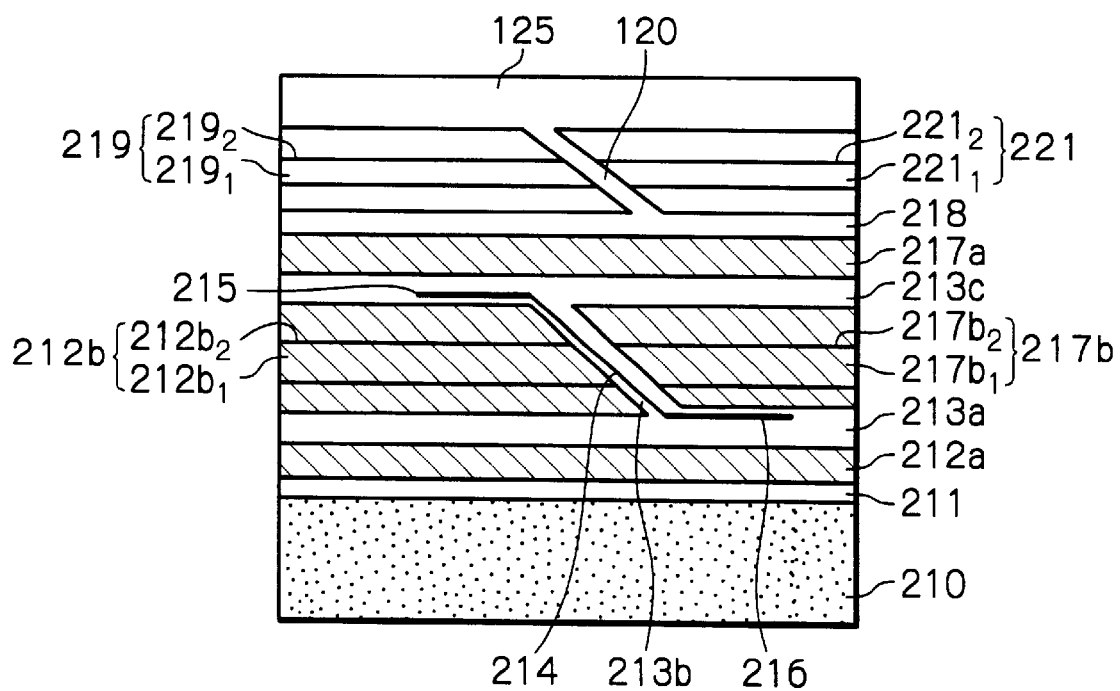
FIG. 7 shows a cross sectional view of a thin-film magnetic head in a further embodiment of the present invention from ABS direction of a slider.

FIG. 7 shows a cross sectional view of the thin-film magnetic head in a further embodiment of the present invention from ABS direction of a slider.

Referring to the figure, reference numeral 210 denotes a substrate, 211 an insulation layer formed on the substrate 210, 212a a shield layer formed on the insulation layer 211, 213a a shield gap layer formed on the shield layer 212a, 212b a shield layer formed on the shield gap layer 213a, respectively. The shield layers 212a and 212b constitute the first shield layer according to the present invention. In this embodiment, the shield layer 212b has a multi-layered structure formed by alternatively stacking a magnetic layer $212b_1$ (thickness is in a range of 0.1–1.0 μm) and a non-magnetic layer $212b_2$ (thickness is in a range of 0.01–0.5 μm).

The inner end surface of the shield layer 212b constitutes a MR sensing or reading region $R_R$ of a MR sensor element, and this end surface is formed with a specific slant angle $\theta_1$ against the surface of the substrate 210.

On the shield layers 212a and 212b, a MR layer 214 sandwiched in a shield gap layer 213b (thickness is in a range of 0.01–0.5 μm) is formed. To the both ends of the MR layer 214, conductive lead layers (with magnetic domain control layers) 215 and 216 are connected. On the shield gap layers 213b and 213c, shield layers 217a and 217b are formed, respectively. The inner end surface of the shield layer 217a is formed with a specific slant angle and faces with the inner end surface of the shield layer 212b. The shield layers 117a and 117b constitute the second shield layer according to the present invention. In this embodiment, the shield layer 217b has a multi-layered structure formed by alternatively stacking a magnetic layer $212b_1$ (thickness is in a range of 0.1–1.0 μm) and a non-magnetic layer $212b_2$ (thickness is in a range of 0.01–0.5 μm). The upper surface of the shield layer 217a is planarized in parallel to the surface of the substrate 210.

Since the end surface of the first shield layer 212b is formed with a specific slant angle of $\theta_1$ against the surface of the substrate 210, the MR reading region $R_R$ of the MR layer 214 stacked on the slant area of the first shield layer is also formed with the slant angle of $\theta_1$ against the surface of the substrate 210. As for $\theta_1$, according to this embodiment, an arbitrary value in a range of 30–60 degrees is selected. If the reading track width is represented by $T_{RW}$, the length of MR reading region becomes $T_{RW}/\cos\theta_1$. The MR layer 214 can be formed with overlapping the outer area of the slant portion as shown in this embodiment, or formed inside the area of the slant portion.

On the shield layer 217a, an insulation layer 218 is stacked, and a first magnetic pole layer 219 is formed. The end surface of the first magnetic pole layer 219 is formed with a specific slant angle of $\theta_2$ against the surface of the substrate 210. In this embodiment, the magnetic pole layer 219 has a multi-layered structure formed by alternatively stacking a magnetic material layer $219_1$, (thickness is in a range of 0.1–1.0 μm) and non-magnetic material layer $219_2$ (thickness is in a range of 0.01–0.5 μm).

On the insulation layer 218, a second magnetic pole layer 221 is formed. The end surface of this layer 221 is facing against the end surface of the first magnetic pole layer 219 through a writing gap 220. In this embodiment, the magnetic pole layer 221 has a multi-layered structure formed by alternatively stacking a magnetic material layer $221_1$ (thickness is in a range of 0.1–1.0 μm) and non-magnetic material layer $221_2$ (thickness is in a range of 0.01–0.5 μm). The sandwiched area of the writing gap 220 corresponds to the magnetic writing region $R_W$ of an inductive coil. The first and second magnetic pole layers 219 and 221 compose a magnetic yoke as well as the magnetic pole layers in the embodiment of FIG. 1, and the inductive coil is helically formed around the yoke. The both ends of the helical coil constitute electrical leads. On the first and second magnetic pole layers 219 and 221, an insulation layer 225 is formed. In this embodiment, $\theta_2=\theta_1=30-60$ degrees. If the writing track width is represented by $T_{WW}$, the thickness of the first and second magnetic layers 19 and 21 becomes $T_{WW}\tan\theta_2$. And the length of the magnetic writing region $R_W$ becomes $T_{WW}/\cos\mu_2$.

The center location of the reading track associated with the MR sensor element and that of the writing track associated with the inductive recording element is matched each other as shown in this embodiment, but the center locations can be shifted in accordance with the skew by a relation between head arm and track in a magnetic disk unit. The vertical position of the MR sensor element and the inductive recording element can be reversibly exchanged. Namely, the inductive recording element may be built on the substrate and on this recording element the MR sensor element may be stacked.

According to this embodiment, each of the shield layers 212b and 217b, and of the first and second magnetic pole layers 219 and 221 has a multi-layered structure formed by alternatively stacking a magnetic material layer and a non-magnetic material layer. By inserting the non-magnetic layer between the magnetic layers, eddy current loss can be reduced and hence high frequency recording and reproducing becomes possible. In addition to this advantage, the similar advantages as those explained previously for the embodiment of FIG. 1. The materials and thickness of layers not stated in the description of this embodiment are the same as those in the embodiment of FIG. 1.

Figure 8:
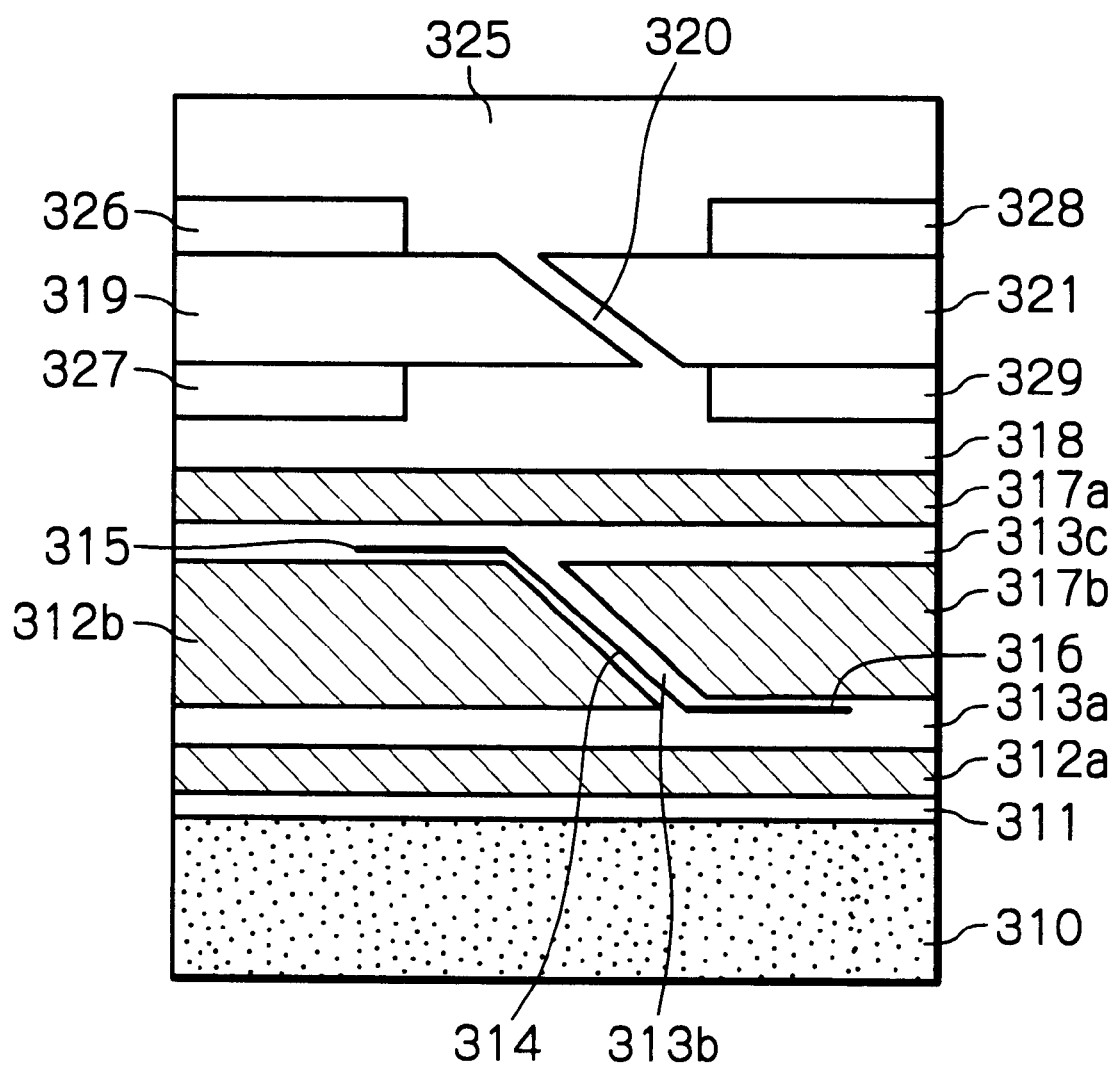
FIG. 8 shows a cross sectional view of a thin-film magnetic head in a still further embodiment of the present invention from ABS direction of a slider.

FIG. 8 shows a cross sectional view of the thin-film magnetic head in a still further embodiment of the present invention from ABS direction of a slider.

Referring to the figure, reference numeral 310 denotes a substrate, 311 an insulation layer formed on the substrate 310, 312a a shield layer formed on the insulation layer 311, 313a a shield gap layer formed on the shield layer 312a, 312b a shield layer formed on the shield gap layer 313a, respectively. The shield layers 312a and 312b constitute the first shield layer according to the present invention.

The inner end surface of the shield layer 312b constitutes a MR sensing or reading region $R_R$ of a MR sensor element, and this end surface is formed with a specific slant angle $\theta_1$ against the surface of the substrate 310.

On the shield layers 312a and 312b, a MR layer 314 sandwiched in a shield gap layer 313b is formed. To the both ends of the MR layer 314, conductive lead layers (with magnetic domain control layers) 315 and 316 are connected. On the shield gap layers 313b and 313c, shield layers 317a and 317b are formed. The inner end surface of the shield layer 317b is formed with a specific slant angle and faces with the inner end surface of the shield layer 312b. The shield layers 317a and 317b constitute the second shield layer according to the present invention. The upper surface of the shield layer 317a is planarized in parallel to the surface of the substrate 310.

Since the end surface of the shield layer 312b is formed with a specific slant angle of $\theta_1$ against the surface of the substrate 310, the MR reading region $R_R$ of the MR layer 314 stacked on the slant area of the shield layer 312b is also formed with the slant angle of $\theta_1$ against the surface of the substrate 310. As for $\theta_1$, according to this embodiment, an arbitrary value in a range of 30–60 degrees is selected. If the reading track width is represented by $T_{RW}$, the length of MR reading region becomes $T_{RW}/\cos \theta_1$. The MR layer 314 can be formed with overlapping the outer area of the slant portion as shown in this embodiment, or formed inside the area of the slant portion.

On the shield layer 317a, an insulation layer 318 is stacked, and a first magnetic pole layer 319 is formed. The end surface of the first magnetic pole layer 319 is formed with a specific slant angle of $\theta_1$ against the surface of the substrate 310.

On the insulation layer 318, a second magnetic pole layer 321 is formed. The end surface of this layer 321 is facing against the end surface of the first magnetic pole layer 319 through a writing gap 320. The sandwiched area of the writing gap 320 corresponds to the magnetic writing region $R_W$ of an inductive coil. The first and second magnetic pole layers 319 and 321 compose a magnetic yoke, and the inductive coil is helically formed around the yoke. The both ends of the helical coil constitute electrical leads. On the first and second magnetic pole layers 319 and 321, an insulation layer 325 is formed. In this embodiment, $\theta_2 = \theta_1 = 30$–60 degrees. If the writing track width is represented by $T_{WW}$, the length of the magnetic writing region $R_W$ becomes $T_{WW}/\cos \theta_2$.

The center location of the reading track associated with the MR sensor element and that of the writing track associated with the inductive recording element is matched each other as shown in this embodiment, but the center locations can be shifted in accordance with the skew by a relation between head arm and track in a magnetic disk unit. The vertical position of the MR sensor element and the inductive recording element can be reversibly exchanged. Namely, the inductive recording element may be built on the substrate and on this recording element the MR sensor element may be stacked.

In this embodiment, auxiliary magnetic pole layers 326 and 327 are attached to the first magnetic pole layer 319, and auxiliary magnetic pole layers 328 and 329 are attached to the second magnetic pole layer 321. These auxiliary magnetic pole layers are made of high resistive materials such as FeMN, FeMO (where M means Al, Si, B, Ti, Zr, Ta, Hf, Nb or Mo), or Co amorphous alloy, and the thickness is in a range of 0.1–10 μm.

According to this embodiment, since the auxiliary magnetic pole layers 326, 327, 328 and 329 are utilized, overwrite characteristics can be enhanced greatly. In addition to this advantage, the similar advantages as those explained previously for the embodiment of FIG. 1. The materials and thickness of layers not stated in the description of this embodiment are the same as those in the embodiments of FIGS. 1 and 6.

Many widely different embodiments of the present invention may be constructed without departing from the spirit and scope of the present invention. It should be understood that the present invention is not limited to the specific embodiments described in the specification, except as defined in the appended claims.

What is claimed is:

1. A thin-film magnetic head with an air bearing surface opposed to a magnetic recording medium in operation, comprising:

a substrate with a surface;

first and second shield layers formed above said substrate; and a magnetoresistive effect sensor element formed between said first and second shield layers, said magnetoresistive effect sensor element having a magnetic sensing region with only one inclined surface at a specific slant angle in said air bearing surface toward the surface of said substrate.

2. The thin-film magnetic head as claimed in claim 1, wherein said first shield layer is constituted by a single shield layer positioned at the same side of said substrate with respect to said magnetoresistive effect sensor element, and wherein said second shield layer is constituted by a single shield layer positioned at opposite side of said substrate with respect to said magnetoresistive effect sensor element.

3. The thin-film magnetic head as claimed in claim 1, wherein said first shield layer is constituted by independent multi shield layers positioned at the same side of said substrate with respect to said magnetoresistive effect sensor element, and wherein said second shield layer is constituted by independent multi shield layers positioned at opposite side of said substrate with respect to said magnetoresistive effect sensor element.

4. The thin-film magnetic head as claimed in claim 1, wherein each of said first and second shield layers consists of only a magnetic layer.

5. The thin-film magnetic head as claimed in claim 1, wherein each of said first and second shield layers consists of a multi-layered structure formed by alternatively stacking magnetic and non-magnetic layers.

6. The thin-film magnetic head as claimed in claim 1, wherein said thin-film magnetic head further comprises a recording element formed in integral with said magnetoresistive effect sensor element, and wherein said recording element comprises a writing gap layer which slants against the surface of said substrate so as to become in parallel with said magnetoresistive effect sensor element, and a first and a second magnetic pole layers facing each other through said writing gap.

7. The thin-film magnetic head as claimed in claim 6, wherein said thin-film magnetic head further comprises auxiliary magnetic pole layers formed in contact with said first and second magnetic pole layers, respectively.

8. The thin-film magnetic head as claimed in claim 6, wherein each of said first and second magnetic pole layers consists of only a magnetic layer.

9. The thin-film magnetic head as claimed in claim 6, wherein each of said first and second magnetic pole layers consists of a multi-layered structure formed by alternatively stacking magnetic and non-magnetic layers.

\* \* \* \* \*